United States Patent [19]
Cho

[11] Patent Number: 5,699,549
[45] Date of Patent: Dec. 16, 1997

[54] MEMORY CARD HAVING A CARD MANAGEMENT INFORMATION AREA FOR IMPROVED FORMAT CAPABILITY AND RECORDING, REPRODUCING, AND ERASING METHODS THEREFOR

[75] Inventor: Chan-dong Cho, Ansan, Rep. of Korea

[73] Assignee: Samsung Electronics Co., Ltd., Kyungki-Do, Rep. of Korea

[21] Appl. No.: 366,915

[22] Filed: Dec. 30, 1994

[30] Foreign Application Priority Data

Oct. 27, 1994 [KR] Rep. of Korea ............. 94-27705

[51] Int. Cl.$^6$ .................... G06F 12/00; G06K 19/067
[52] U.S. Cl. ............... 395/442; 395/421.11; 395/182.04; 348/233; 235/492
[58] Field of Search ................... 395/442, 429, 395/430, 431, 432, 416, 417, 418, 419, 421.11, 182.03, 182.04; 235/380, 492; 348/231, 232, 233; 365/52, 230.03

[56] References Cited

U.S. PATENT DOCUMENTS

| | | | |
|---|---|---|---|
| 4,813,014 | 3/1989 | DeBell | 365/45 |
| 4,985,920 | 1/1991 | Seki | 235/380 |
| 5,068,744 | 11/1991 | Ito | 358/310 |
| 5,093,785 | 3/1992 | Iijima | 395/481 |
| 5,226,145 | 7/1993 | Moronaga et al. | 395/412 |
| 5,434,618 | 7/1995 | Hayashi et al. | 348/231 |
| 5,437,012 | 7/1995 | Mahajan | 395/164 |
| 5,454,096 | 9/1995 | Otsuka et al. | 395/401 |

FOREIGN PATENT DOCUMENTS

| | | |
|---|---|---|
| 0294201 | 2/1988 | European Pat. Off. . |
| 2248707 | 4/1992 | United Kingdom . |

*Primary Examiner*—Glenn Gossage
*Attorney, Agent, or Firm*—Sughrue, Mion, Zinn, Macpeak & Seas, PLLC

[57] ABSTRACT

A memory card is formatted so as to provide a first index area for storing a chapter attribute table made up of attribute information corresponding to a plurality of chapters, each chapter formed by a plurality of clusters required for performing a one-time recording of sequential information into a data area, a second index area for storing a cluster table made up of the used information of each cluster corresponding to the order of clusters of the data area, a data area divided into a plurality of clusters, and a card management information area for storing card management information including the information regarding recorded data, information regarding an associated application device relating to the recorded data and information regarding the number of recorded chapters, arranged in that order. According to one aspect of the memory card, a defective block redundant area advantageously can be provided between the data area and the card management information area. This format promotes utilization of the memory card as a recording medium for storing all types of digital information irrespective of the specific application field or the specific data type. Methods adapted for recording, reproducing and erasing the memory card are also described. A used card can be initialized so as to be reused regardless of differences in the kind of information or the type of device employed, thereby enhancing the practical use of the card and increasing its compatibility.

21 Claims, 12 Drawing Sheets

FIG. 4

| OFFSET | CONTENTS | SIZE (BYTES) |
|---|---|---|
| 00h | CHECK BIT STRING | 16 |
| 10h | FORMAT VERSION INFORMATION | 2 |
| 12h | FORMAT DATE | 2 |
| 14h | FORMAT CHARACTER ATTRIBUTE STRING | 8 |
| 2Bh | APPLICATION DEVICE INFORMATION CHARACTER STRING | 16 |
| 3Bh | CARD KIND INDICATOR | 1 |
| 3Ch | CARD SIZE | 4 |
| 40h | PAGE SIZE | 2 |
| 42h | BLOCK SIZE | 2 |
| 44h | NUMBER OF BLOCKS CONSTITUTING A CLUSTER | 1 |
| 45h | RESERVED (00H) | 10 |
| 4Fh | NUMBER OF RECORDED CHAPTERS | 2 |
| 15h | START ADDRESS OF CHAPTER ATTRIBUTE TABLE | 4 |
| 55h | RESERVED (00H) | 10 |
| 5Fh | DATA AREA SIZE | 4 |
| 63h | NUMBER OF DEFECTIVE CLUSTERS | 4 |
| 67h | START ADDRESS OF DATA AREA | 4 |
| 6Bh | RESERVED (00H) | 4 |
| 6Fh | NUMBER OF DUPLICATE CLUSTER TABLES | 2 |
| 71h | NUMBER OF ENTRIES OF CLUSTER TABLE | 4 |
| 75h | CLUSTER TABLE START ADDRESS | 4 |
| 79h | RESERVED (00H) | 6 |
| 7Fh | DEFECTIVE BLOCK REDUNDANT AREA SIZE | 2 |
| 81h | NUMBER OF CARD MANAGEMENT INFORMATION BLOCKS | 2 |
| 83h | NUMBER OF DEFECTIVE BLOCKS | 2 |
| 85h | RESERVED (00H) | 10 |
| 8Fh | DEFECTIVE BLOCK MANAGEMENT TABLE | 2 × 512 |
| 49Fh | RESERVED (00H) | 2942 |
| FFEh | CHECK SUM | 2 |

FIG. 5

| 88h | AAh | AAh | AAh | AAh | AAh | AAh | AAh | AAh | AAh | AAh | AAh | AAh | AAh | AAh | AAh | AAh | 88h |

FIG. 6

| 00h | 01h |

FIG. 7

| b15 | b14 | b13 | b12 | b11 | b10 | b9 | b8 | b7 | b6 | b5 | b4 | b3 | b2 | b1 | b0 |
|-----|-----|-----|-----|-----|-----|----|----|----|----|----|----|----|----|----|----|
| Y   | Y   | Y   | Y   | Y   | Y   | Y  | M  | M  | M  | M  | D  | D  | D  | D  | D  |

FIG. 12

| D7h | XXh | XXh | XXh | XXh | XXh | XXh | XXh |

FIG. 13

| b7 | b6 | b5 | b4 | b3 | b2 | b1 | b0 |

NOT DEFINED (b7–b4)
- b0 — DATA
- b1 — VOICE
- b2 — AUDIO
- b3 — VIDEO

FIG. 14

| B5 | B4 | B3 | B2 | B1 | B0 |
|----|----|----|----|----|----|
| Y  | M  | D  | H  | M  | S  |

FIG. 15

| SEQUENCE NUMBER | CONTENTS |
|---|---|
| 1 | FFF5h |
| 2 | 0001h |
| 3 | FFFAh |
| 4 | FFFFh |
| ⋮ | ⋮ |
| n | FFFFh |

MEMORY CARD HAVING A CARD MANAGEMENT INFORMATION AREA FOR IMPROVED FORMAT CAPABILITY AND RECORDING, REPRODUCING, AND ERASING METHODS THEREFOR

BACKGROUND OF THE INVENTION

1. Field of the Invention

The present invention relates to a memory card and, more particularly, to a memory card having a standardized recording format usable as a recording medium with respect to various information types. The present invention also relates to recording, reproducing and erasing methods using the memory card.

2. Brief Discussion of Related Art

With the ongoing tendency for signal processing of digital form signals, various recording media are being introduced. For example, digital information recording and reproducing devices such as a computer and compact disc player (CDP), digital audio tape (DAT), mini-disc (MD), compact disc-interactive (CD-I) and compact disc-read only memory (CD-ROM) systems use disk-type or tape-type recording media. Such devices record and read information using various techniques, employing different recording media and different data formats. Accordingly, only one type of information is recordable using a selected kind of device. It will be noted that the methods for recording and reading the information vary depending on the device being employed, even though a recording media suitable for many applications may be used. Therefore, the degree of compatibility among recording media is minimal.

As integration of semiconductor memory devices increases, i.e., as storage capacity increases, the possibility of using lightweight, thin and small memory cards as a recording medium for various information types becomes greater. Conventional techniques for using a memory card include, methods for storing audio data (European Patent No. 0 294 201), music data (U.S. Pat. No. 4,813,014) or image data (U.S. Pat. No. 5,226,145). Such conventional techniques for recording and reproducing specific data are confined to only one specific application field. These techniques cannot record and reproduce specific data recorded according to a different application field.

SUMMARY OF THE INVENTION

Accordingly, it is an object of the present invention to provide a memory card which can record and reproduce various kinds of data.

Another object of the present invention is to provide recording, reproducing and erasing methods adapted to the memory card.

These and other objects, features and advantages according to the present invention are provided by a memory card having a record format. The record format includes a data area divided into a plurality of clusters, a first index area for storing a chapter attribute table, the chapter attribute table being made up of attribute information corresponding to a plurality of chapters, each chapter formed by a plurality of clusters which are required for one-time recording of sequential information into a respective data area, a second index area for storing a cluster table made up of the used information of each cluster corresponding to the order of the clusters of the data area, and a card management information area for storing card management information, the card management information including information on recorded data, information on an application device associated with the recorded data, and information on the number of recorded chapters.

According to one aspect of the present invention, the first index area includes a pointer area for storing a plurality of pointer values defining the start address of each area where the attribute information for plural chapters is recorded, and an attribute information area for storing the attribute information regarding each chapter for each area having the corresponding pointer values as start addresses and the sequential number information on the start cluster among a plurality of clusters constituting each chapter.

According to another aspect of the present invention, the above-mentioned areas are formed in the order of the first index area, second index area, data area and card management information area.

The memory card also includes a defective block redundant area having blocks for replacing a defective block generated in the first and second index areas or in the card management information area. Preferably, the card management information area includes a defective block management table for recording position information on the identified defective block and position information on the block in the defective block redundant area which replaces the identified defective block. The defective block redundant area advantageously can be located between the data area and the card management information area. The information used by the cluster table includes unused information, defective information, chapter end information and the sequential number information of the next cluster.

According to yet another aspect of the present invention, the memory card of the present invention has a recording format which enables the reading and writing of information regardless of differences or discrepancies between the kind of information and the type of device. Thus, the practical use of the card can be enhanced and compatibility can be improved.

These and other objects, features and advantages according to the present invention are provided by a method for recording information on a memory card. Advantageously, the method includes steps for dividing a storage area of the memory card having the above-described recording format into first and second index areas, a data area, a defective block redundant area and a card management information area, initializing each respective area, checking whether additional recording into chapters is possible with reference to the number of the chapters currently recorded in the card management information area, sequentially recording the data of a chapter into respective unused clusters with reference to the cluster table of the second index area, and registering the used information to the cluster table in response to the sequential number of the cluster where the data is recorded, and terminating the recording at the last cluster of the chapter to be recorded, increasing the number of currently recorded chapters by one in the card management information area when the recording ends, and registering the newly recorded attribute information of the corresponding chapter and sequential number information of the respective start cluster into the chapter attribute table of the first index area.

During the initializing step, the card management information area is initialized and then the first and second index areas are initialized. The step of initializing the card management information includes substeps for determining whether the last block of the memory card is defective, recording predetermined card management information in the last block, when the last block of the memory card is not defective, determining whether an error is present when the recording of the card management information ends, when an error is found in the error determining step or a defective block is determined as present in the defective block determining step, changing the recording position to a respective block immediately preceding the last block and increasing the number of the defective blocks by one, reducing the size of the defective block redundant area, repeating the defective block determining step after the number of blocks in the card management information area is increased by one, and terminating the initialization of the card management information, when no error is found in the error determining step.

The step of initializing the chapter attribute table of the first index area includes substeps for determining whether the very first block of the memory card is defective. When the very first block is not defective, the initialized value of the attribute information of the information unit is recorded to the first block, and it is determined whether an error is present when the recording ends. When an error is found in the error determining step or a defective block is determined to be present in the defective block determining step, the recording position is changed to a respective unused redundant block of the defective block redundant area, the number of the defective blocks is increased by one, the position information of the respective defective block and the position information of the block which is replaced for the defective block is registered on the defective block management table of the card management information area, and the defective block determining step, is repeated. The initialization of the chapter attribute table terminated when is no error is found in the error determining step.

The step of initializing the cluster table of the second index area includes substeps for determining whether the block of the second index is defective. When the block of the second index area is not defective, determining whether a defective cluster exists among the clusters of the data area is performed, registering the used information on the cluster table as a defective information in response to the sequential number of the defective cluster found in the defective cluster determining step is performed, and registering the used information on the cluster table as unused information in response to the sequential number of the normal cluster is performed. Then, determining whether an error is present when the recording ends is performed. When one of an error is found and a defective block is determined, changing the recording position to a redundant block of the defective block redundant area and increasing the number of the defective blocks by one is performed, and registering the position information of the defective block and the position information of the block which is replaced for the defective block on the defective block management table of the card management information area is performed. Then, the defective block determining step is repeated, and when no error is found in the error determining step, duplicating the cluster table where the initially used information is registered in order to form a plurality of tables is performed, and the initialization of the cluster table is terminated.

The recording step advantageously may include substeps for processing the current cluster as a defective area when one of a defective block is found in the course of recording information into the cluster and an error is found after the information is recorded in the cluster unit, and registering the used information of the corresponding sequential number of the cluster table as defective information.

These and other objects, features and advantages according to the present invention are provided by a method for reproducing information, which preferably includes steps for selecting one among the recorded chapters, continuously reading the sequential number information until the end information of the selected chapter is read, by adopting a method in which the sequential number information of the start cluster of the selected chapter is read with reference to the chapter attribute table and the respective used information corresponding to the read sequential number information is read with reference to the cluster table, and reading data from respective clusters included in the data area according to the order of reading the sequential number information of the read clusters.

These and other objects, features and advantages according to the present invention are provided by a method for erasing information, which includes steps for selecting the chapter to be erased, recording the information representing the erased chapter into the attribute information of the selected chapter and re-arranging the priority of the chapters following the erased chapter, registering used information of the cluster table of the clusters that constitute one chapter to be erased as unused information and erasing the recorded contents of the respective clusters included in the data area, and decreasing the number of the currently recorded chapters in the card management information area based on a count of erased chapters.

It will be appreciated that the recording method according to the present invention allows the defective block to be checked and permits the defective block to be replaced by the redundant block. Thus, controlling the damaged portion is standardized and card-usage efficiency can be enhanced. In addition, the used card can be initialized so as to be re-used regardless of the kind of information or the device employed.

BRIEF DESCRIPTION OF THE DRAWINGS

The above objects and other advantages of the present invention will become more apparent by describing in detail a preferred embodiment thereof with reference to the attached drawings in which:

FIG. 4 is a view showing a format of card attribute information recorded in the card management information area of the present invention;

FIG. 5 is a view showing a format of the check bit string shown in FIG. 4;

FIG. 6 is a view showing a format of the format version shown in FIG. 4;

FIG. 7 is a view showing a format of the formatting date shown in FIG. 4;

FIG. 12 is a view showing a format of a chapter name of the attribute table of FIG. 11;

FIG. 13 is a view showing a format of the "kinds of the information" parameter in the attribute table of FIG. 11;

FIG. 14 is a view showing a format of the chapter recording date of the attribute table of FIG. 11;

FIG. 15 is a view showing a format of the cluster table recorded in the second index area of FIGS. 2 and 3;

DETAILED DESCRIPTION OF THE PREFERRED EMBODIMENTS

Figure 1:
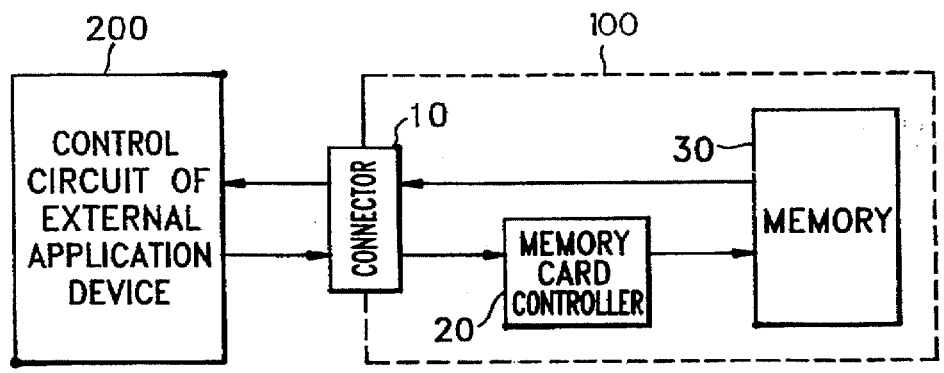
FIG. 1 is a high level block diagram showing a memory card of the present invention.

As shown in FIG. 1, a memory card 100 includes a connector 10 for electrically connecting the card 100 to a control circuit 200 of an external application device, a memory card controller 20 for generating memory control signals in the card which are responsive to respective external memory card control signals input via connector 10 and which represent the state of the memory card, and a memory 30 in which predetermined data is written to or read from according to the control signals produced by memory card controller 20. Memory card controller 20 and memory 30 are embodied within a memory card case, while connector 10 is installed on the memory card case, suitably disposed for external connection. The memory cards can advantageously be roughly divided into read-only cards and recordable cards, depending on the kind of memory device. A read-only memory (ROM) device is used as the memory of a read-only card, while static random access memory (SRAM), erasable programmable read-only memory (EPROM), electrically-erasable programmable read-only memory (EEPROM) or flash memory devices advantageously can be used for a recordable card.

Figure 2:
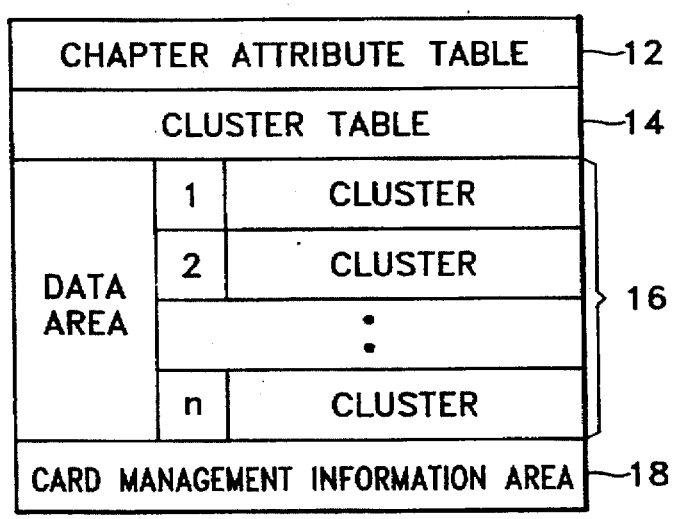
FIG. 2 is a memory map of the cluster of the memory card of one embodiment of the present invention.
Figure 3:
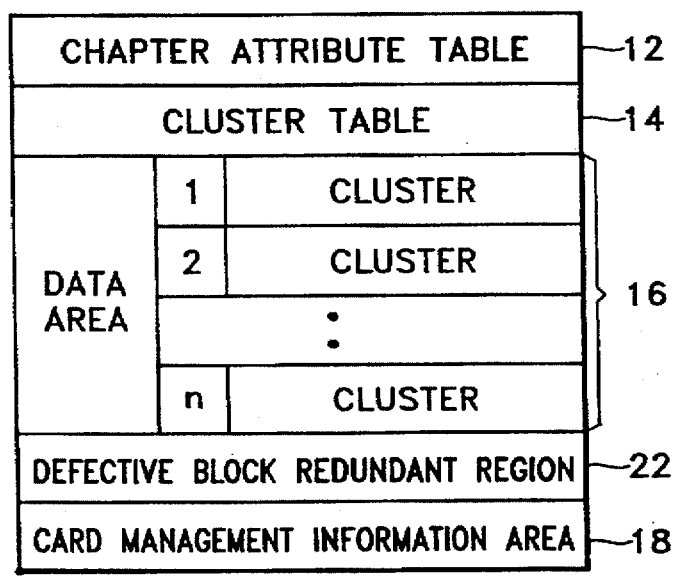
FIG. 3 is a memory map of the cluster of the memory card of another embodiment of the present invention.

FIG. 2 is a memory map of the read-only card of the present invention, while FIG. 3 is a memory map of the recordable card. Both types of cards include a first index area 12 where a chapter attribute table is recorded, a second index area 14 where a cluster table is recorded, a data area 16 divided into a plurality of clusters, and a card management information area 18. The recordable card preferably includes a defective block redundant region 22.

As shown in FIG. 4, the card management information recorded in card management information area 18 includes the card attribute information. Preferably, the typically recorded data of each card includes such information as a check bit string (16 bytes), format version information (2 bytes), the format date (2 bytes), a format character attribute string (8 bytes), a character string of application device information (16 bytes), an indicator of the kind of card being employed (1 byte), a card size (4 bytes), a page size (2 bytes), a block size (2 bytes), the number of blocks constituting a cluster (1 byte), and a reserved area (10 bytes). The number of recorded chapters (2 bytes), the start address of the chapter attribute information table (4 bytes), another reserved area (10 bytes), as well as data area information consisting of data area size (4 bytes), the number of defective clusters (4 bytes), the start address of the data area (4 bytes), and a reserved area (4 bytes) are also provided. Cluster table information consisting of the number of cluster table duplications (2 bytes), the number of cluster table entries (4 bytes), the start address of the cluster table (4 bytes), a reserved area (6 bytes), a defective block redundant area size (2 bytes), the number of card management information blocks (2 bytes), the number of defective blocks (2 bytes), another reserved area (10 bytes), a defective block management table (1K-byte), another reserved area (2,942 bytes), and check sum information (2 bytes) are also included in the card management area 18.

Card management information area 18 is located in a respective 4K-byte sized last block of card 100. However, when the last block is damaged, the immediately preceding block is employed, and all the check-bit strings of the damaged last block are recorded by "00h."

Normally, the check bit string information shown in FIG. 5 is recorded in the check bit string. The format version information has a fixed value of "01h" as the current major version value, as shown in FIG. 6, and a fixed value of "00h" as the current minor version value. Accordingly, the above-mentioned values can be changed when a version update is performed. The format date is the date when a memory card is formatted by a specific application device; the date format being shown in FIG. 7. Renewal of the date is performed after the memory card is re-formatted or the defective block table is changed.

Figures 8, 9, 10:
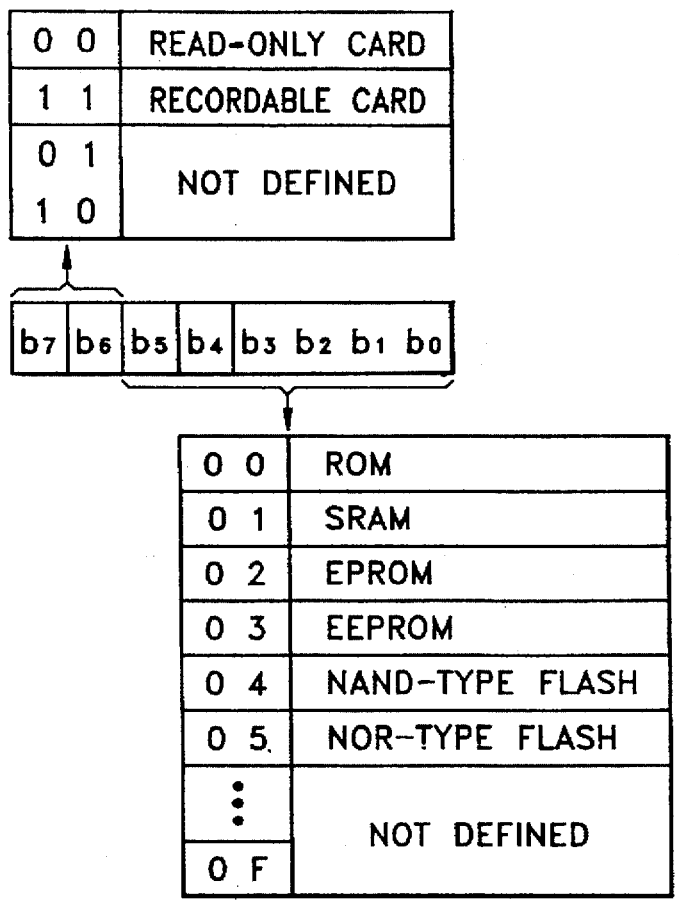
FIG. 8 is a view showing a format of the card kind indicator shown in FIG. 4.
FIG. 9 is a view showing a format of the list contents of the defective block management table shown in FIG. 4.
FIG. 10 illustrates an embodiment of the defective block management table shown in FIG. 4.

The format character string consists of the arbitrary 8 characters. The application device information character string indicates the discriminating information for using the card 100 with a specific application device, and the name of the device that first formats the card is recorded in 16 bytes. The card kind indicator is for representing the type of memory device card, wherein the Upper two bits indicate whether the memory device is read-only or recordable, while the lower six bits indicate the kind of memory device, as shown in FIG. 8. Accordingly, the read-only card is expressed by the byte "00000000," and the recordable card using EEPROMs can be expressed using the byte "11000011."

As to card 100 size, the entire storage capacity of the card can be expressed using the block as a basic unit. For the page size, the size of one page is expressed in byte units, where the page size is smaller than the block size and defined by $2^n$ within 1 k-byte. The block size is expressed in byte units. The cluster is expressed by the number of blocks, where 256 blocks represent the maximum size of the cluster. In an exemplary case, one page includes 256 bytes and one block is 4 K-bytes. The number of chapters indicates the total number of chapters currently recorded, where, in an exemplary case, the maximum number of recordable chapters is 128. In the read-only card, the number of chapters is fixed. However, in the recordable card, the chapter number is arbitrary, e.g., increasing by one when recording is performed and decreasing by one when erasing is performed.

The start address of the chapter attribute table of the first index indicates the start address of the first index area. The size of the data area is indicated by a block unit. The number of total blocks of the data area can be obtained by the following expression:

$$DB = TB - (RB + CMB + CATB + CTB),$$

where DB is the number of total blocks of the data area, TB is the number of total blocks of a card, RB is the number of blocks of the defective block redundant area, CMB is the number of blocks of the card management information area, CATB is the number of blocks of the chapter attribute table, and CTB is the number of blocks of the cluster table.

The number of defective clusters is the number of the defective clusters among the clusters in data area 16. The actual size of the data area 16 advantageously can be obtained by subtracting the number of blocks corresponding to defective clusters from the total number of blocks of the data area 16.

A number of cluster table duplications is the number of tables, and generally, at least two tables are allocated so that the damaged contents can be restored by employing another cluster table when one of the tables has been destroyed. The number of entries of a cluster table indicates the total number of registered clusters and, thus, represents the size of the data area 16. The start address of the cluster table indicates the start address of the second index area 14. The size of the defective block redundant area 22 holding redundant blocks for replacing defective blocks in areas excluding the data area 16 can be expressed in block units. Preferably, the number of blocks in the defective block redundant area 22 is determined upon initialization.

The card management information is normally located in the last block of a card, but it advantageously can be stored in a respective block of the immediately preceding defective block redundant area if the last block is defective. Accordingly, the number of blocks of the card management information area 18 is generally one. When a defective block is generated, the number of blocks increases by one and the number of blocks of the defective block redundant area decreases by one. The number of defective blocks increases whenever the defective block is generated. The defective block management table in the card management information area 18 records the position of the defective block generated within a card, and indicates the block position within the defective block redundant area 22 where the data which was intended to be recorded in the defective block is actually recorded. The number of entries of the defective block management table is the same as that of the blocks of the defective block redundant area. As shown in FIG. 9, the unused redundant block "00h," defective redundant block "FDh" and defective block address "XXh" are recorded for each entry.

As shown in FIG. 10, each entry of the defective block management table is sequentially numbered. In addition, each entry number indicates the priority of the blocks in the defective block redundant area 22. For example, when a defective block is generated in card 100, data to be recorded in the defective block is recorded in an empty block according to the order of its location in the defective block redundant area 22. The address of the defective block generated in the defective block management table entry in area 18 indicates that the block is recorded to indicate that the contents of the defective block are recorded in the block redundant area 22. Thus, the number of defective blocks increases by one.

The check sum is obtained by adding the contents from the staff of the block management information to the previous check sum, and then, taking the two's complement of the lower sixteen bits as the result. Accordingly, it is normal when the check sum is zero. Preferably, any overflow of the check sum can be ignored.

Figure 11:
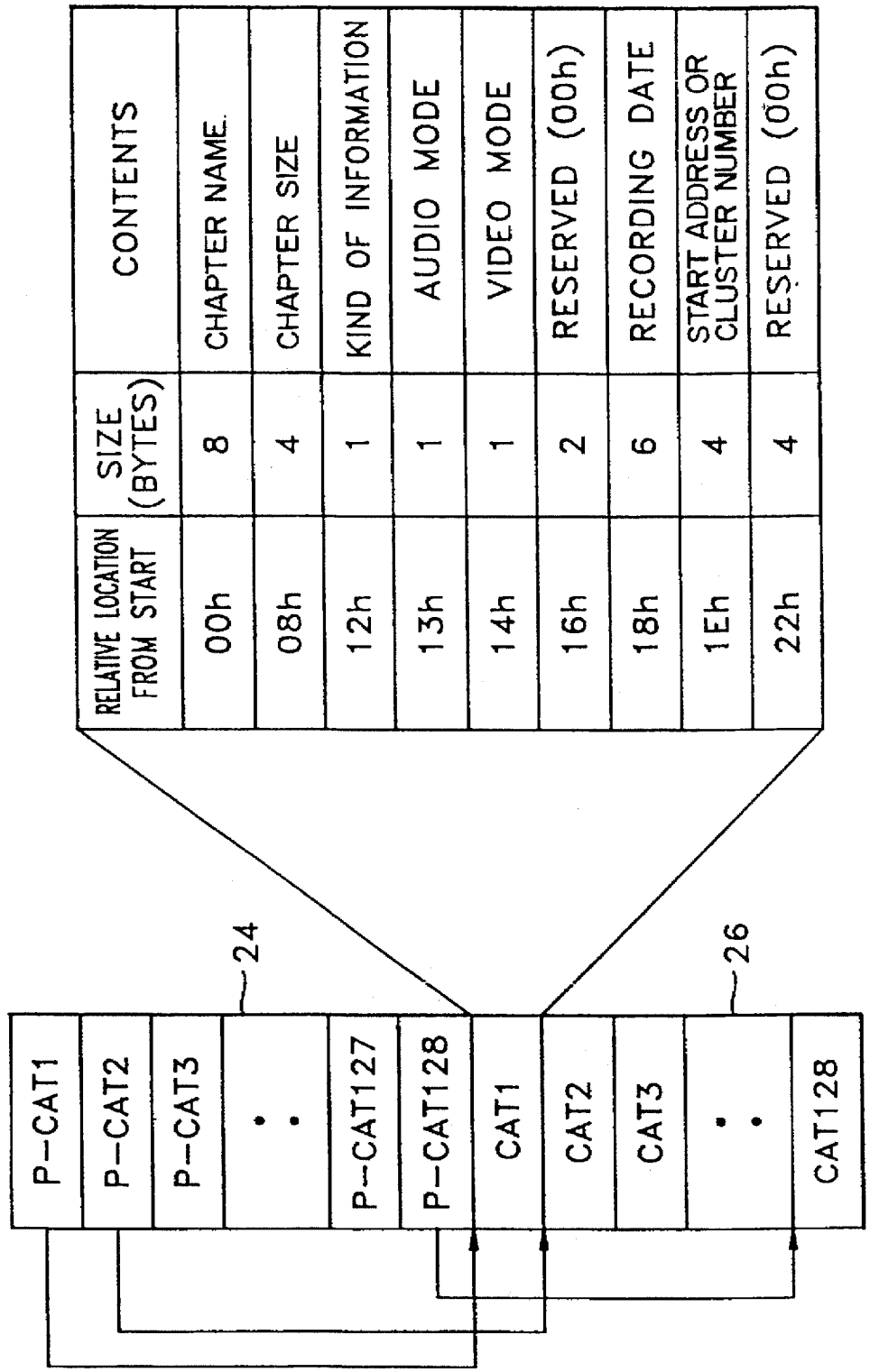
FIG. 11 is a view showing a format of the chapter attribute table of the first index area illustrated in FIGS. 2 and 3.

The chapter attribute table recorded in first index area 12 consists of 128 pointers 24 and an attribute table 26 having 128 entries consisting of 31-byte chapter attribute information as shown in FIG. 11. Each pointer indicates the start address of the corresponding attribute information of attribute table 26. For example, if the chapter number is "1", the value of the 1st pointer among the 128 pointers is read, and the attribute information having the read value as a start address is read from attribute table 26, to thereby read the attribute information of the chapter. The number "00h" is preferably recorded for a pointer having no corresponding chapter. The attribute information recorded in each entry of the attribute table 26 consists of chapter name (8 bytes), chapter size (4 bytes), kind of information (1 byte), audio mode (1 byte), video mode (1 byte), a reserved area (2 bytes), chapter recording date (6 bytes), start address or cluster number (4 bytes) and another reserved area (4 bytes). The chapter name consists of eight characters. As discussed in greater detail below, the first byte value among the eight bytes representing the chapter name is changed to "D7h" when the chapter is erased, as shown in FIG. 12, to thereby enable the re-use of a recorded data area 16 in card 100. The chapter size is expressed in byte units. Preferably, the kind of information indicates the information currently recorded in the respective chapter. As shown in FIG. 13, when the corresponding bit value is "1," the corresponding information is recorded. Bit "0" indicates data, bit "1" indicates voice, bit "2" indicates audio (music), bit "3" indicates video, and the other bits are not defined. The audio mode represents the compressed mode of the audio signal, while the video mode represents the compressed mode of the video signal. As shown in FIG. 14, the chapter recording date indicates the date information (year/month/date) and time information (hours/minutes/seconds).

The start address or cluster number is for searching the record position of the respective chapter in the data area, and the entry number of the cluster table in the area 14 is recorded onto the start address or cluster number. The start address or cluster number indicates the first cluster among the clusters making up the chapter.

Referring to FIG. 15, the cluster table recorded in second index area 14 is a map illustrating how the space of data area 16 is allocated, and in an exemplary case, the size of each entry is sixteen bits. That is, the cluster table preferably can be defined by the entry depending on the sequential number of clusters in response to the order of all clusters which divide data area 16. The information used by the corresponding cluster is recorded in each entry. A number "FFFFh" is recorded to indicated an unused cluster; "FFF5h" is recorded to indicate a defective cluster; "FFFAh" is recorded to indicate an end cluster of the corresponding chapter; and an entry number of the next cluster is recorded to indicate a cluster which is in normal use.

Figure 16:
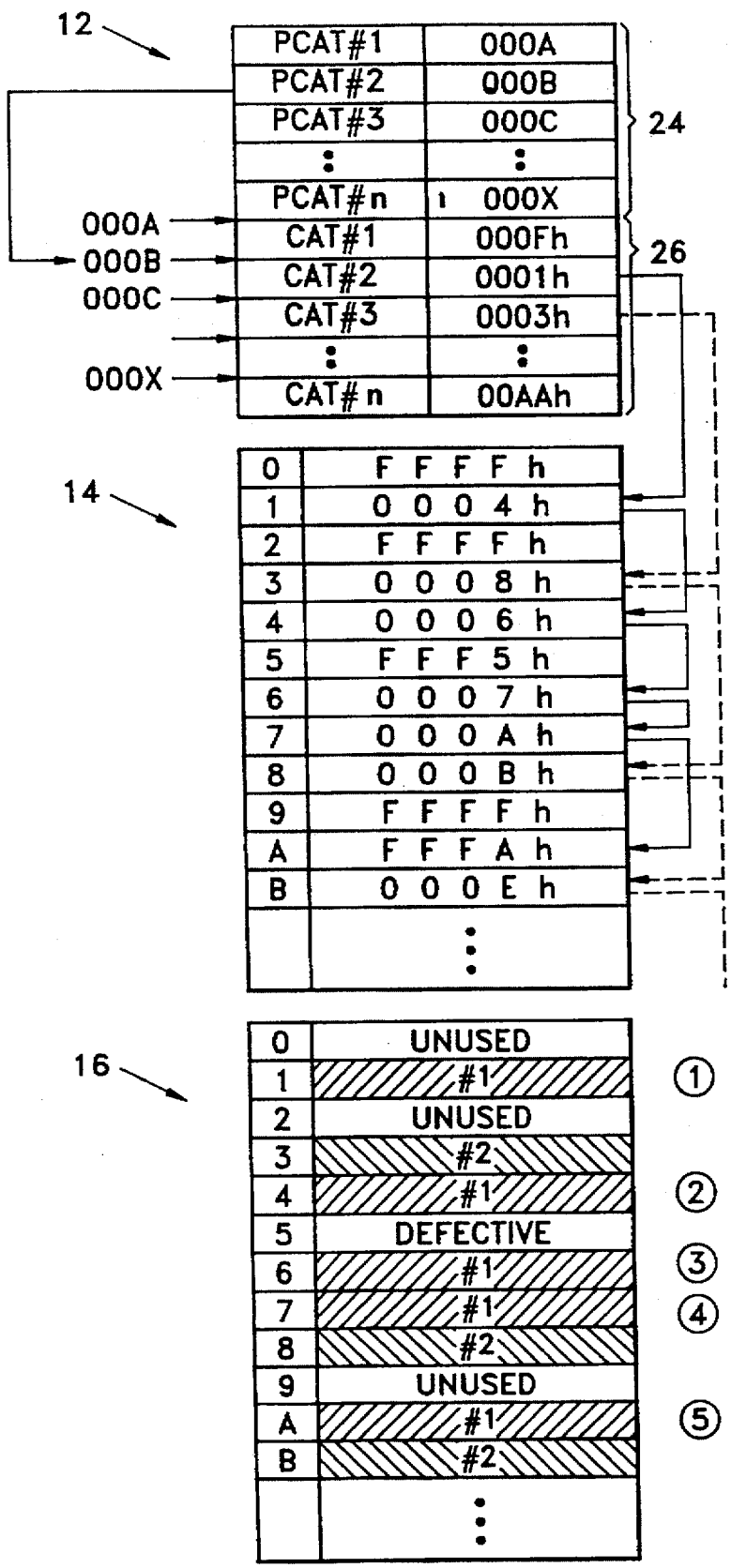
FIG. 16 illustrates an example which is useful in explaining the recording, reproducing and erasing operations according to the present invention.

Referring to FIG. 16, if chapter "2" is selected, value "000B" of the second pointer of pointers 24 of first index area 12 is read and the corresponding attribute information of the second entry of attribute table 26, having the value of the second pointer as a start address, is advantageously read. The corresponding entry of the cluster table of second index area 14 is read using the sequential number information "0001h" of the start address or cluster number, which is included in the attribute information of table 26. Then, contents of the entry of "0001h," i.e., "0004h," indicates the sequential number of the cluster which is read next. For example, the arrows on the right of the table representing index area 14 indicate that "0006h," "0007h," "000Ah" and "FFFAh" are sequentially read. "FFFAh" is read finally, which indicates an ending of the corresponding chapter and, thus, the reading of the cluster table is terminated. Then, according to the order of reading the sequential numbers of the read clusters, the clusters 1-4-6-7-A of data area 16 corresponding to 0001-0004-0006-0007-000A are sequentially read. Thus, the data corresponding to chapter "2" can be read.

When recording is performed, the cluster entries where "FFFFh" information is recorded are sequentially searched with reference to the cluster table 14 so that data can be recorded thereto. The sequential number of the first cluster of a respective chapter is provided as information on the starting address or cluster number of the attribute table of area 12, and the sequential number information of the next cluster is recorded in the entry of the cluster table of area 14. When a defective cluster is detected in the course of performing the above operations, "FFF5h" is recorded as the entry to the corresponding defective cluster, and the data is recorded onto the next empty cluster. "FFFAh" is recorded in the last cluster of the chapter and the recording ends. When the chapter is erased, "FFFF" is recorded in the table area for all clusters constituting the erased chapter in area 16, and the contents of the clusters corresponding to the chapter are all erased from the data area.

The essential steps employed in performing the recording, reproducing and erasing methods of the thus-formatted memory card of the present invention are described below.

When information is to be recorded in a new format without regard to the memory card first employed or the currently recorded information, the formatting is performed according to the application device in use. Initialization can be achieved by dividing the memory area of a card into sectors and recording the correct data in each sector, as shown in FIG. 2 or FIG. 3. The initialization sequence is such that the card management information is first initialized in card management information area 18 and then the first and second index areas 12, 14 are initialized.

Figure 17:
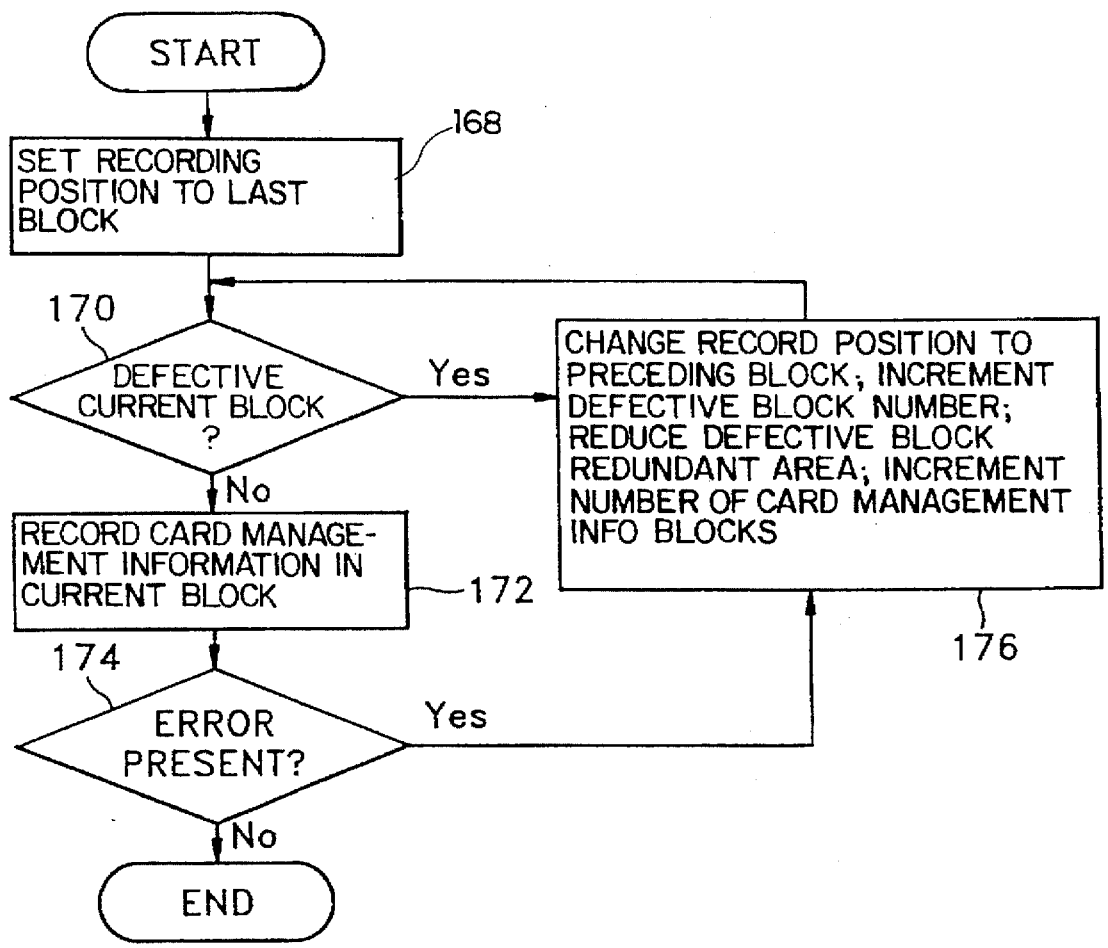
FIG. 17 is a flowchart illustrating the initialization process of the card management information area according to the present invention.

The step of initializing the card management information is as follows. Referring to FIG. 17, the record position is set to the last block during step 168, and the the last block of the memory is advantageously checked to determine whether the block is defective during step 170. When the last block is not defective, the card management information shown in FIG. 4 is recorded in the last block during step 172. Then, a determination is made as to whether an error is present when the recording of card management information ends during step 174. When an error is found during in step 174, or a defective block is found during step 170, the recording position is changed to the block preceding the last block, the number of defective blocks is increased by one, the size of the defective block redundant area is decreased by one, and the number of blocks of the card management information area is increased by one during step 176. Then, the process returns to step 170. When no error is found during step 174, the initializing of the card management information ends.

Figure 18:
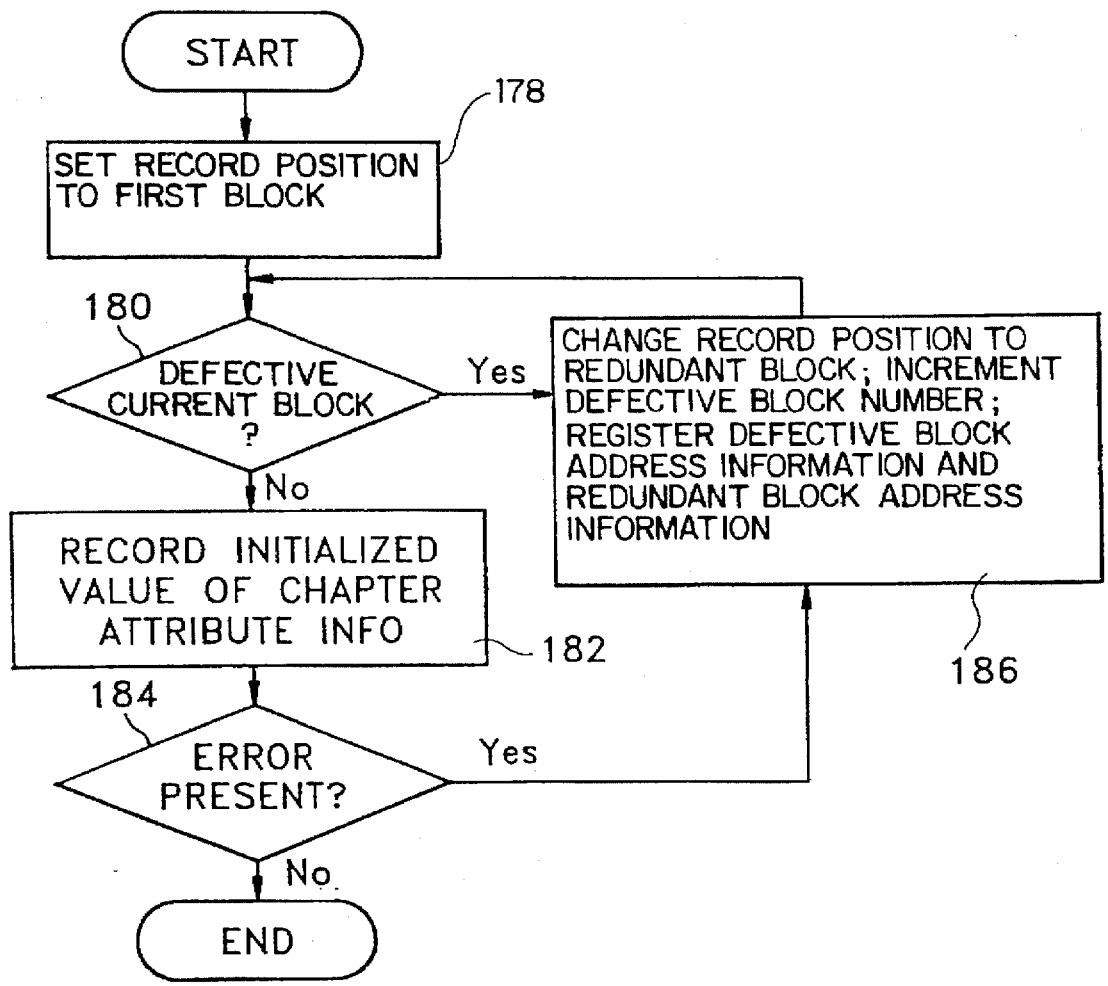
FIG. 18 is a flowchart illustrating the initialization process of the chapter attribute table according to the present invention.

The step of initializing the chapter attribute table of first index area 12 is shown in FIG. 18. The record position is set to the first block during step 178, and the first block of the memory card 100 is checked to determine whether the block is defective during step 180. When the first block is not defective, the initialized value of the chapter attribute information is recorded in the first block during step 182. That is, all pointer values are recorded as "00h" and the contents of all attribute tables are recorded as "FFh." When recording ends, a determination is made as to whether an error is present during step 184. If an error is found during step 184, or a defective block was found during step 180, the recording position is changed to the redundant block of defective block redundant area 22, the number of defective blocks is increased by one, and the position or address information of the defective block and the position or address information of the redundant block are registered in the defective block management table of card management information area 18 during step 186. Then, the process returns to step 180. If there is no error found during step 184, the initialization of the chapter attribute table of area 12 ends.

Figure 19:
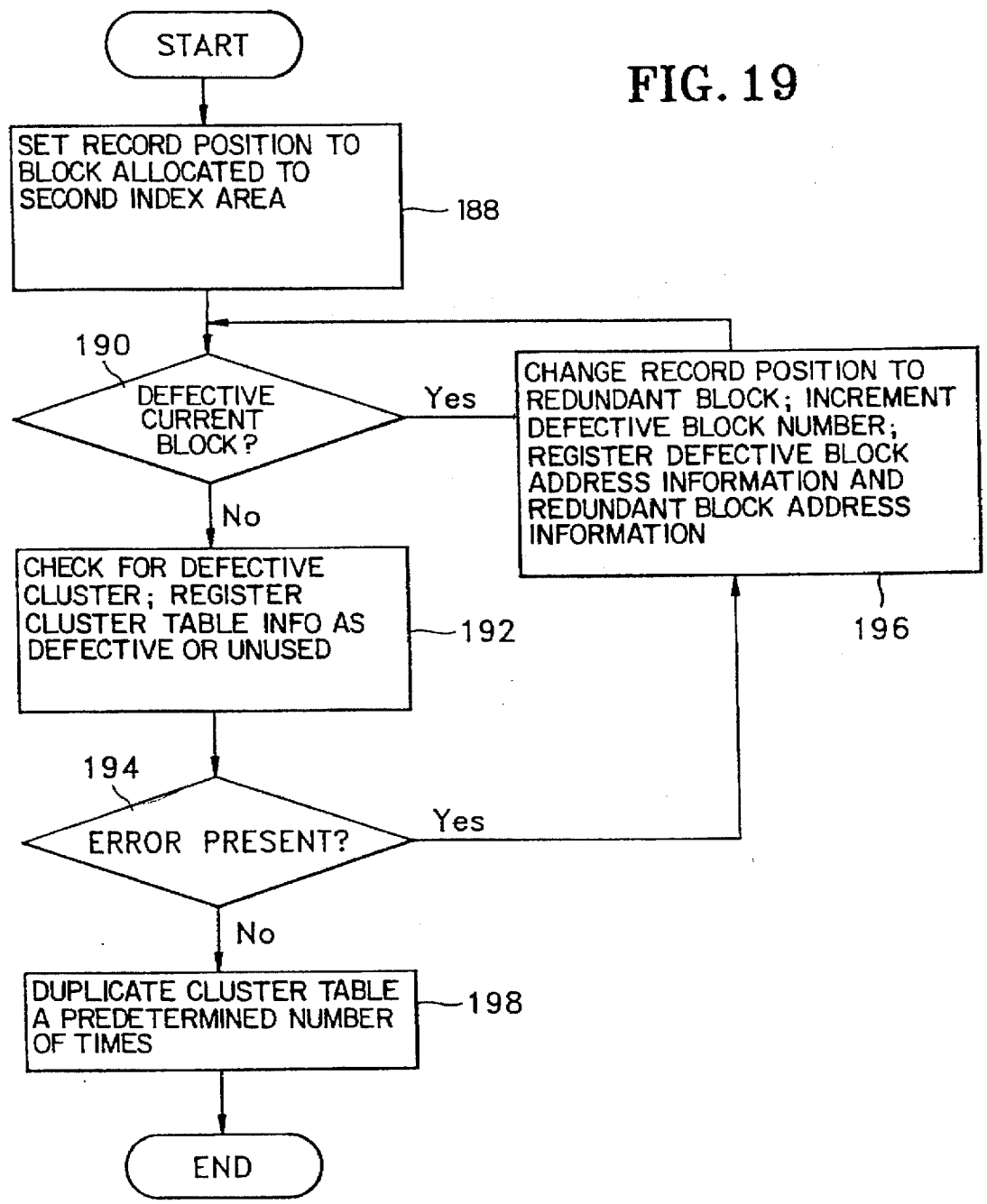
FIG. 19 is a flowchart illustrating the initialization process of the cluster table according to the present invention.

Referring to FIG. 19, the process of initializing the cluster table of second index area 14 starts by setting the record position to the block allocated to second index area 14 during step 188 and determining if such block is defective during step 190. If the block is not defective, a search or check is made for a defective cluster among a plurality of clusters of the data area 16, the used information on the cluster table is registered as defective in response to the sequential number of the searched defective cluster, and the used information on the cluster table is registered as unused information in response to the sequential number of the normal cluster during step 192. When recording ends, a determination is made as to whether an error is present during step 194. When an error is found during step 194 or a defective block was found during step 190, the recording position is changed to the redundant block of defective block redundant area 22, the number of defective blocks is increased by one, and the position or address information of the defective block and the position or address information of the redundant block are registered in the defective block management table of the card management information area 18 during step 196. Then, the process returns to step 190. When no error is present during step 194, the cluster table of area 14 where initially used information is registered is duplicated a predetermined number of times during step 198, allowing a plurality of cluster tables to be formed. The initialization of the cluster table then ends.

As described above, the memory card area is, in an exemplary case, divided into first and second index areas 12, 14, a data area 16, a defective block redundant area 22 and a card management information area 18. A method for initializing each area has been described above, and a method for recording the data will now be described.

Figure 20:
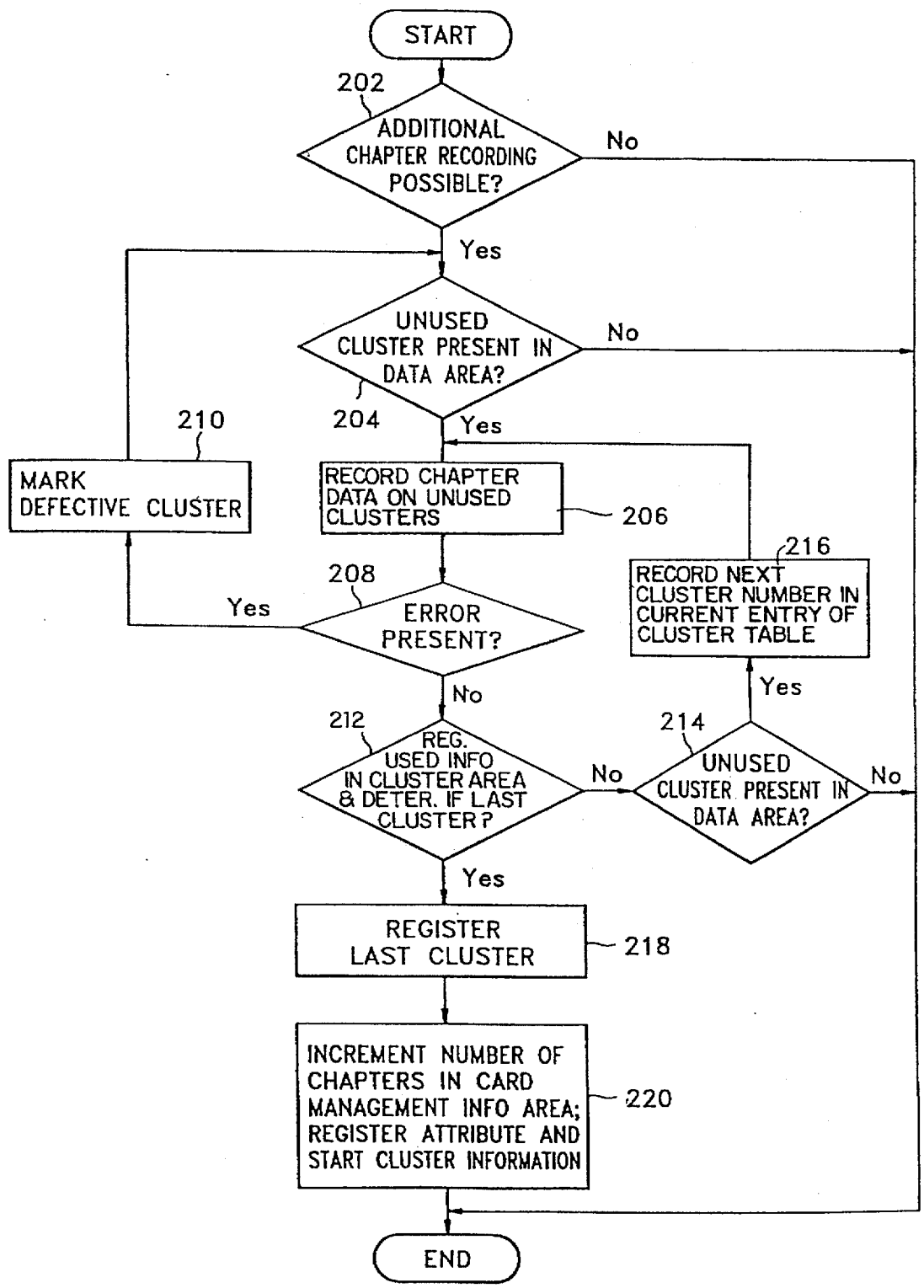
FIG. 20 is a flowchart illustrating a recording method adapted for use with the memory card of the present invention.

Referring to FIG. 20, a determination as to whether additional chapter recording is possible based on the number of chapters currently recorded is performed during step 202. If additional chapter recording is possible, a search for unused clusters of the cluster table of second index area 14 is made during step 204, and the chapter data is recorded sequentially in the unused clusters of data area 16 during step 206. Then, another determination is made as to whether an error occurred during the recording of the data for one cluster during step 208. When a corresponding error is found, that cluster is marked as defective in the entry of the current cluster table of area 14 during step 210. The process then returns to step 204.

When no error is present during step 208, the used information is registered in the cluster table of area 14 in response to the sequential number of the clusters where the data is newly recorded and the area is checked to determine whether it is the last cluster of the chapter being recorded during step 212. If the record cluster is not the last cluster, a determination is made as to whether an unused cluster for sequentially recording the next data in data area 16 is present during step 214. When an unused cluster is available, the sequential number of the next cluster is registered in the entry of the current cluster table during step 216. The process then returns to step 206. When the result is the last cluster during step 212, recording is terminated and the last cluster is registered in the current entry of the cluster table of area 14 during step 218. When the recording is terminated, the number of the chapters currently recorded in the card management information area 18 is increased by one, and the attribute information of the newly recorded chapter and the sequential number information of the start cluster are registered in the chapter attribute table of the first index area 12 during step 220. In the course of recording, when the number of unused clusters is insufficient for recording all of the data of the corresponding chapter, a new chapter cannot be added.

Figure 21:
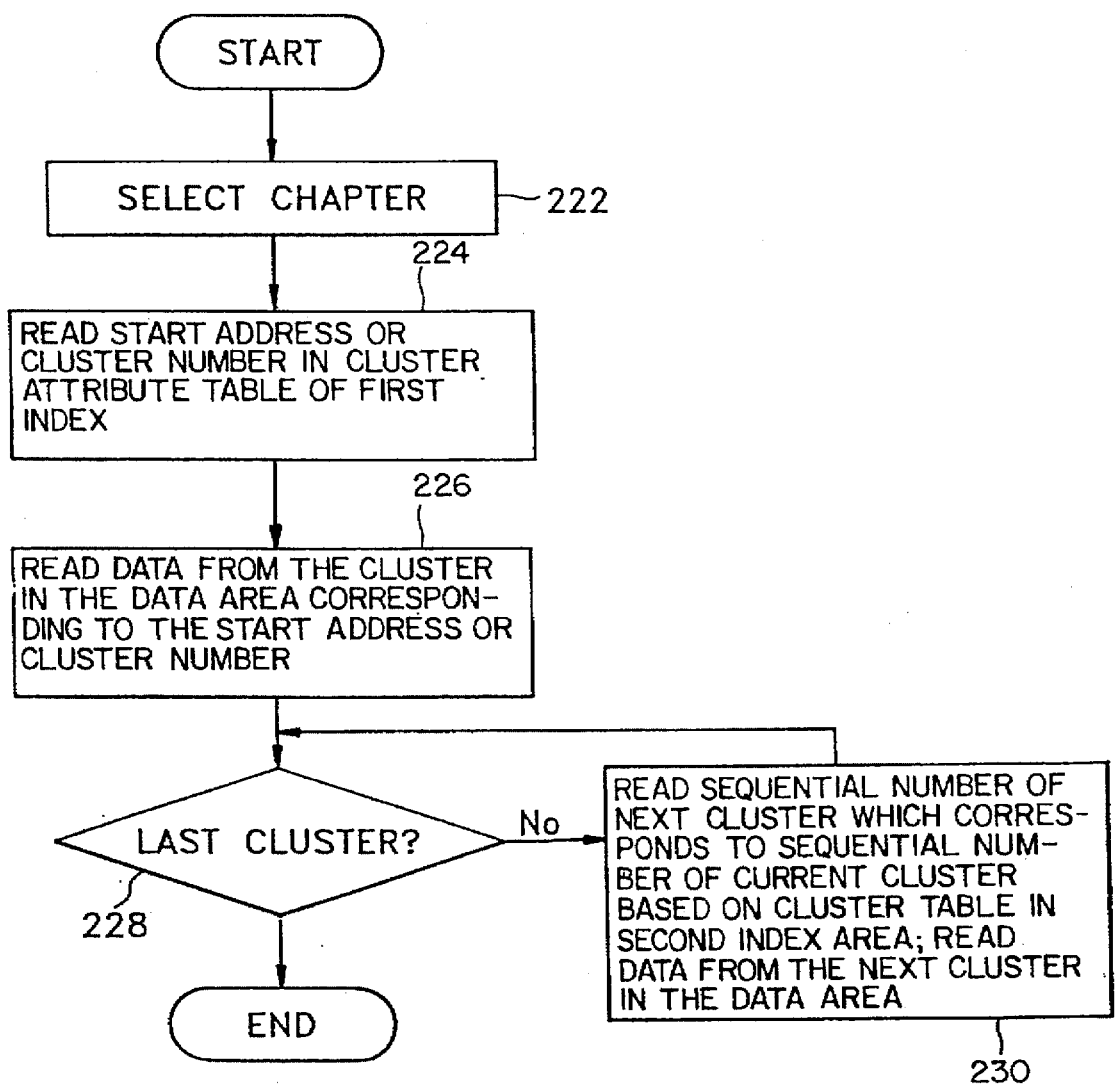
FIG. 21 is a flowchart illustrating a reproducing method adapted for use with the memory card adapted for use with the present invention.

A method for reproducing the data from a memory card according to the present invention will now be described while referring to FIG. 21. During reproduction, at least one chapter is advantageously selected from among the recorded chapters during step 222, and the sequential number corresponding to the start address or cluster number of the selected chapter is read with reference to the chapter attribute table of first index area 12 during step 224.

Then the data from the cluster in the data area 16 corresponding to the start address is read during step 226. Afterwards, it is determined if the cluster is the last chapter in step 228. If the cluster is not the last cluster, the sequential number of the current cluster is read based on the cluster table in the second index area 14. Subsequently, the data is read from the next cluster in the data area 16. Then, the routine returns to step 228. If the next cluster is the last cluster in step 228, the routine ends.

A method for erasing the recorded chapter from a memory card 100 according to the present invention will now be described. When the chapter to be erased is selected, the information representing the chapter being erased is recorded in the attribute information of the selected chapter, the priority of the chapters after the erased chapter is re-arranged, the unused information of the cluster tables of the clusters constituting the chapter to be erased is registered as unused information, the contents recorded in the clusters of data area 16 are erased, and the number of the chapters currently recorded in the card management information area 18 is decreased by a number corresponding to the number of erased chapters.

As described above, a recording format of a memory card 100 is standardized in the present invention. Thus, information can be read and recorded regardless of discrepancies between the kind of information and the associated device, by employing the same formatting and control method for the application devices which use a memory card as recording media. Thus, the present invention enhances the utilization of the memory card 100, particularly with respect to compatibility. In the above-described preferred embodiment, the exemplary case where a microprocessor is not included in the memory card 100 is explained. However, for an integrated circuit (IC) card provided with an on-board microprocessor, a person skilled in the art can easily modify and use the present invention without departing from the spirit and scope as set out in the accompanying claims. Moreover, other modifications and variations to the invention will be apparent to those skilled in the art from the foregoing disclosure and teachings. Thus, while only certain embodiments of the invention have been specifically described herein, it will be apparent that numerous modifications may be made thereto without departing from the spirit and scope of the invention.

What is claimed is:

1. A memory card having a record format, said memory card comprising:

a data area divided into a plurality of clusters;

a first index area for storing a chapter attribute table, said chapter attribute table being made up of a plurality of attribute information corresponding to a plurality of chapters, respectively, wherein each of said chapters is formed by a plurality of clusters which are used to record sequential data information into said data area;

a second index area for storing a cluster table containing a plurality of cluster information for said clusters, respectively, wherein said plurality of cluster information corresponds to an order in which said clusters are read from said data area; and a card management information area for storing card management information including first information corresponding to a characteristic of recorded data, second information indicating an application device associated with said recorded data, and third information representing a number of recorded chapters, wherein said first index area comprises:

a pointer area for storing a plurality of pointer values; and an attribute information area for storing said chapter attribute table containing said plurality of attribute information, wherein said pointer values respectively define start addresses at which said plurality of attribute information of said chapters are respectively recorded in said chapter attribute table, wherein said plurality of attribute information are respectively associated with a plurality of sequential number information, and wherein each of said plurality of sequential number information corresponds to a respective start cluster among a plurality of clusters constituting each of said chapters.

2. The memory card according to claim 1, wherein said areas of said memory card are disposed in said memory card in an order of said first index area, said second index area, said data area, and said card management information area.

3. The memory card according to claim 1, wherein said cluster information stored in said cluster table includes unused cluster information, defective data information, chapter-end information, and sequential cluster number information corresponding to a next cluster.

4. The memory card according to claim 1, wherein said plurality of attribute information respectively comprises a plurality of characteristic information relating to characteristics of said chapters, respectively.

5. The memory card according to claim 1, wherein said memory card further comprises a defective block redundant area including a plurality of replacement blocks, wherein one replacement block of said replacement blocks is substituted for a defective block when said defective block is generated in at least one of said first index area, said second index area, and said card management information area.

6. The memory card according to claim 5, wherein said card management information area further comprises a defective block management table for recording position information corresponding to said defective block and said one replacement block in said defective block redundant area.

7. The memory card according to claim 5, wherein said defective block redundant area is located between said data area and said card management information area.

8. An information transfer method for performing at least one of a recording operation and a reproducing operation on a memory card formatted to include a data area divided into a plurality of clusters, a first index area for storing a chapter attribute table for storing attribute information corresponding to a plurality of chapters, respectively, each of said chapters formed by a plurality of clusters containing sequential data information in said data area, a second index area for storing a cluster table containing cluster information for said clusters, respectively, to ascertain an order of in which said clusters are read from said data area, and a card management information area for storing card management information including first information corresponding to a characteristic of recorded data, second information indicating an application device associated with said recorded data, and third information representing a number of recorded chapters, said method comprising the steps of:

(a) formatting said memory card into said first index area, said second index area, said data area, a defective block redundant area, and said card management information area;

(b) initializing said first index area, said second index area, said data area, said defective block redundant area, and said card management information area;

(c) determining if an unused cluster exists within said data area based on unused cluster information contained in said cluster table stored in said second index area;

(d) sequentially recording chapter data corresponding to one chapter of said chapters in said unused cluster;

(e) recording used cluster information in said cluster table at an address in response to said chapter data being recorded in said unused cluster so that said unused cluster is designated as a used cluster;

(f) repeating steps (c) to (e) and terminating recording after said chapter data has been recorded in a last cluster of said one chapter of said chapters;

(g) increasing a count of currently recorded chapters by one in said card management information area when said chapter data of said one chapter has been completely recorded; and (h) recording new attribute information of said one chapter and sequential number information of a start cluster corresponding to said one chapter in said chapter attribute table contained in said first index area.

9. The method according to claim 8, wherein said method comprises and an erasing method for erasing a recorded chapter from a memory card, said erasing method comprising the steps of:

(i) selecting a certain chapter of said chapters to be erased;

(j) recording erased chapter information representing an erased chapter in said chapter attribute table, wherein said erased chapter information is part of said attribute information of said certain chapter;

(k) reordering priority of said chapters following said certain chapter;

(l) recording unused cluster information in said cluster table at locations corresponding to said clusters constituting said certain chapter; and decreasing a number of recorded chapters in said card management information area by one.

10. The method according to claim 8, wherein said step (d) comprises the steps of:

(c)(i) determining if a recording error occurs when said chapter data is recorded in said unused cluster; and (c)(ii) identifying said unused cluster as a defective cluster when said recording error is found.

11. The method according to claim 10, wherein said step (e) comprises the step of:

(e)(i) when said recording error has been found in said step (c)(i), recording defective cluster information in said cluster table at an address location which corresponds to sequential number information of said defective cluster.

12. The method according to claim 8, further comprising the step of:

(i) checking whether additional recording into said chapters is possible based on a recordation count of said chapters currently contained in said card management information area.

13. The method according to claim 12, wherein said step (i) is performed immediately after said step (b).

14. The method according to claim 8, comprising the steps of:

(i) selecting a certain chapter to be reproduced;

(j) reading sequential number information of a start cluster corresponding to said certain chapter from said chapter attribute table in said first index area;

(k) designating said start cluster as a current cluster; and (l) reading said chapter data from said current cluster from said data area.

15. The method according to claim 14, further comprising the steps of:

(m) determining if said current cluster is a last cluster;

(n) if said current cluster is not said last cluster, reading sequential number information of a next cluster from said cluster table, wherein said sequential number information of said next cluster is stored in said cluster table at an address which corresponds to said sequential number information of said current cluster;

(o) if said current cluster is not said last cluster, designating said next cluster as a new current cluster and repeating said steps (l) to (o); and (p) if said current cluster is said last cluster, terminating reproduction of said certain chapter.

16. The method according to claim 8, wherein said initializing step (b) comprises the steps of:

(b)(i) initializing said card management information area;

(b)(ii) initializing said first index area; and (b)(iii) initializing said second index area.

17. The method according to claim 16, wherein said initializing substep (b)(iii) comprises the steps of:

(b)(iii)(a) determining whether a particular block of said second index area is defective;

(b)(iii)(b) when said particular block of said second index area is not defective, determining whether a defective cluster exists among said clusters of said data area;

(b)(iii)(c) recording defective data information in said cluster table when said defective cluster found in said step (b)(iii)(b), wherein said defective data information is recorded at an address location of said cluster table which corresponds to a sequential number of said defective cluster;

(b)(iii)(d) recording unused cluster information in said cluster table when a non-defective cluster is found in said step (b)(iii)(b), wherein said unused cluster information is recorded at an address location of said cluster table which corresponds to a sequential number of said non-defective cluster;

(b)(iii)(e) determining whether an error is present when said unused cluster information has been recorded in said cluster table; and (b)(iii)(f) when said error is found in said step (b)(iii)(e) or said defective block is determined in said step (b)(iii)(a), changing a present recording position from said particular block to a redundant block of said defective block redundant area and increasing a count of defective blocks by one;

(b)(iii)(g) registering first position information of said defective block and second position information of said redundant block in a defective block management table of said card management information area when said error is found in said step (b)(iii)(e) or said defective block is determined in said step (b)(iii)(a);

(b)(iii)(h) repeating said steps (b)(iii)(a) to steps (b)(iii)(g); and (b)(iii)(i) when no error found in said step (b)(iii)(e), duplicating said cluster table to form at least one back-up cluster table.

18. The method according to claim 16, wherein said initializing substep (b)(i) comprises the steps of:

(b)(i)(a) determining whether a particular block of said memory card is defective;

(b)(i)(b) recording said card management information in said particular block when said particular block of said memory card is not defective;

(b)(i)(c) determining whether an error is present when said card management information has been recorded;

(b)(i)(d) when said error is found in said step (b)(i)(c) or said particular block is determined to be defective in step (b)(i)(a), changing a recording position from said particular block to a new block and increasing a count of defective blocks by one;

(b)(i)(e) reducing a size of said defective block redundant area by one block when said error is found in said step (b)(i)(c) or said particular block is determined to be defective in said step (b)(i)(a);

(b)(i)(f) increasing a block count of blocks in said card management information area by one and repeating said steps (b)(i)(a) to (b)(i)(e) when said error is found in said step (b)(i)(c) or said particular block is determined to be defective in said step (b)(i)(a); and (b)(i)(g) terminating said initialization substep (b)(i) of said card management information area when no error is found in said step (b)(i)(c).

19. The memory card recording and/or reproducing method according to claim 18, wherein said particular block is a last block of said memory card and wherein said new block is a block immediately preceding said last block.

20. The method according to claim 16, wherein said initializing substep (b)(ii) comprises the steps of:

(b)(ii)(a) determining whether a particular block of said memory card is defective;

(b)(ii)(b) when said particular block is not defective, recording initialized values of said attribute information of said chapters in said particular block;

(b)(ii)(c) determining whether an error is present when said initialized values have been recorded;

(b)(ii)(d) when said error is found in said step (b)(ii)(c) or said particular block is found to be defective in step (b)(ii)(a), changing a present recording position from said particular block to a redundant block of said defective block redundant area and increasing a count of defective blocks by one, registering first position information of said particular block which is defective and second position information of said redundant block in a defective block management table of said card management information area, and repeating said steps (b)(ii)(a) to (b)(ii)(c); and (b)(ii)(e) terminating said initialization substep (b)(ii) of said chapter attribute table when no error is found during said step (b)(ii)(c).

21. The method according to claim 20, wherein said particular block is a first block of said memory card.

* * * * *